United States Patent
Lee et al.

(10) Patent No.: US 8,055,251 B2
(45) Date of Patent: Nov. 8, 2011

(54) TERMINAL AND METHOD OF SETTING SERVICE FOR DATA COMMUNICATION THEREIN

(75) Inventors: Jong Hoon Lee, Incheon (KR); Woo Seong Kim, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 12/274,188

(22) Filed: Nov. 19, 2008

(65) Prior Publication Data

US 2009/0131032 A1    May 21, 2009

(30) Foreign Application Priority Data

Nov. 20, 2007 (KR) .................. 10-2007-0118804

(51) Int. Cl.
*H04M 3/00* (2006.01)
(52) U.S. Cl. ............... 455/418; 455/566; 455/435.2
(58) Field of Classification Search ............... 370/229; 455/435.2, 566, 418
See application file for complete search history.

(56) References Cited

U.S. PATENT DOCUMENTS

| | | | |
|---|---|---|---|
| 6,269,330 B1 * | 7/2001 | Cidon et al. | 714/43 |
| 6,553,010 B1 * | 4/2003 | Jober | 370/328 |
| 6,600,903 B1 * | 7/2003 | Lilja et al. | 455/67.11 |
| 6,728,215 B1 * | 4/2004 | Alperovich et al. | 370/252 |
| 6,999,438 B2 * | 2/2006 | Nounin et al. | 370/332 |
| 7,050,773 B2 * | 5/2006 | Bi | 455/226.1 |
| 7,058,387 B2 * | 6/2006 | Kumar et al. | 455/406 |
| 2003/0083041 A1 * | 5/2003 | Kumar et al. | 455/406 |
| 2004/0015582 A1 * | 1/2004 | Pruthi | 709/224 |
| 2005/0013244 A1 * | 1/2005 | Parlos | 370/229 |
| 2005/0059397 A1 * | 3/2005 | Zhao | 455/435.2 |
| 2005/0079821 A1 * | 4/2005 | Bi | 455/63.1 |
| 2006/0052098 A1 * | 3/2006 | Lee et al. | 455/422.1 |
| 2007/0127375 A1 * | 6/2007 | Bae et al. | 370/229 |
| 2007/0147388 A1 * | 6/2007 | Kim et al. | 370/395.21 |
| 2008/0057894 A1 * | 3/2008 | Aleksic et al. | 455/187.1 |

* cited by examiner

*Primary Examiner* — Charles Shedrick

(74) *Attorney, Agent, or Firm* — Birch, Stewart, Kolasch & Birch, LLP

(57) ABSTRACT

A terminal including a wireless communication unit configured to perform data communication with at least one other terminal, a display configured to display a screen for selecting a communication application for executing the data communication and a screen for selectively selecting a communication quality of service corresponding to the communication application, and a controller configured to apply the selected communication quality of service to the communication application for executing the data communication.

14 Claims, 8 Drawing Sheets

TERMINAL AND METHOD OF SETTING SERVICE FOR DATA COMMUNICATION THEREIN

This application claims the benefit of the Korean Patent Application No. 10-2007-0118804, filed in Korea on Nov. 20, 2007, which is hereby incorporated by reference as if fully set forth herein.

BACKGROUND OF THE INVENTION

1. Field of the Invention

The present invention relates to a terminal and corresponding method for selectively setting a service for data communication therein.

2. Discussion of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc. However, the user has no input on what type of a quality of service is used with data communication performed by the mobile terminal.

SUMMARY OF THE INVENTION

Accordingly, one object of the present invention is to address the above-noted and other drawbacks.

Another object of the present invention is to provide a terminal and corresponding method for selectively setting a service for data communication performed by the mobile terminal.

To achieve these objects and other advantages and in accordance with the purpose of the invention, as embodied and broadly described herein, the present invention provides in one aspect a terminal including a wireless communication unit configured to perform data communication with at least one other terminal, a display configured to display a screen for selecting a communication application for executing the data communication and a screen for selectively selecting a communication quality of service corresponding to the communication application, and a controller configured to apply the selected communication quality of service to the communication application for executing the data communication.

In another aspect, the present invention provides a method of controlling a terminal, and which includes allowing wireless data communication with at least one other terminal, displaying a screen for selecting a communication application for executing the data communication and a screen for selectively selecting a communication quality of service corresponding to the communication application, and applying the selected communication quality of service to the communication application for executing the data communication.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
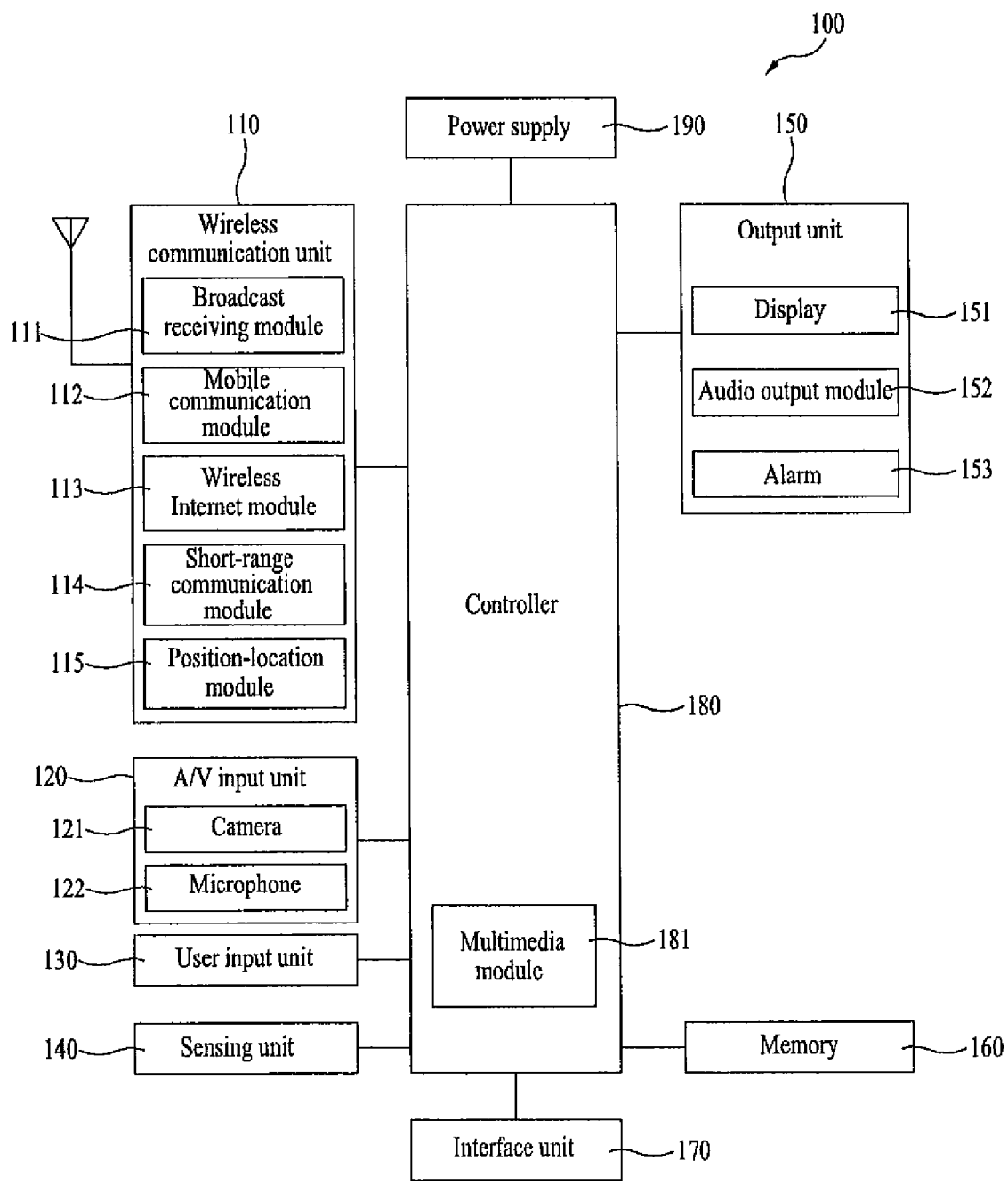
FIG. 1 is a block diagram of a mobile terminal in according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESC) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
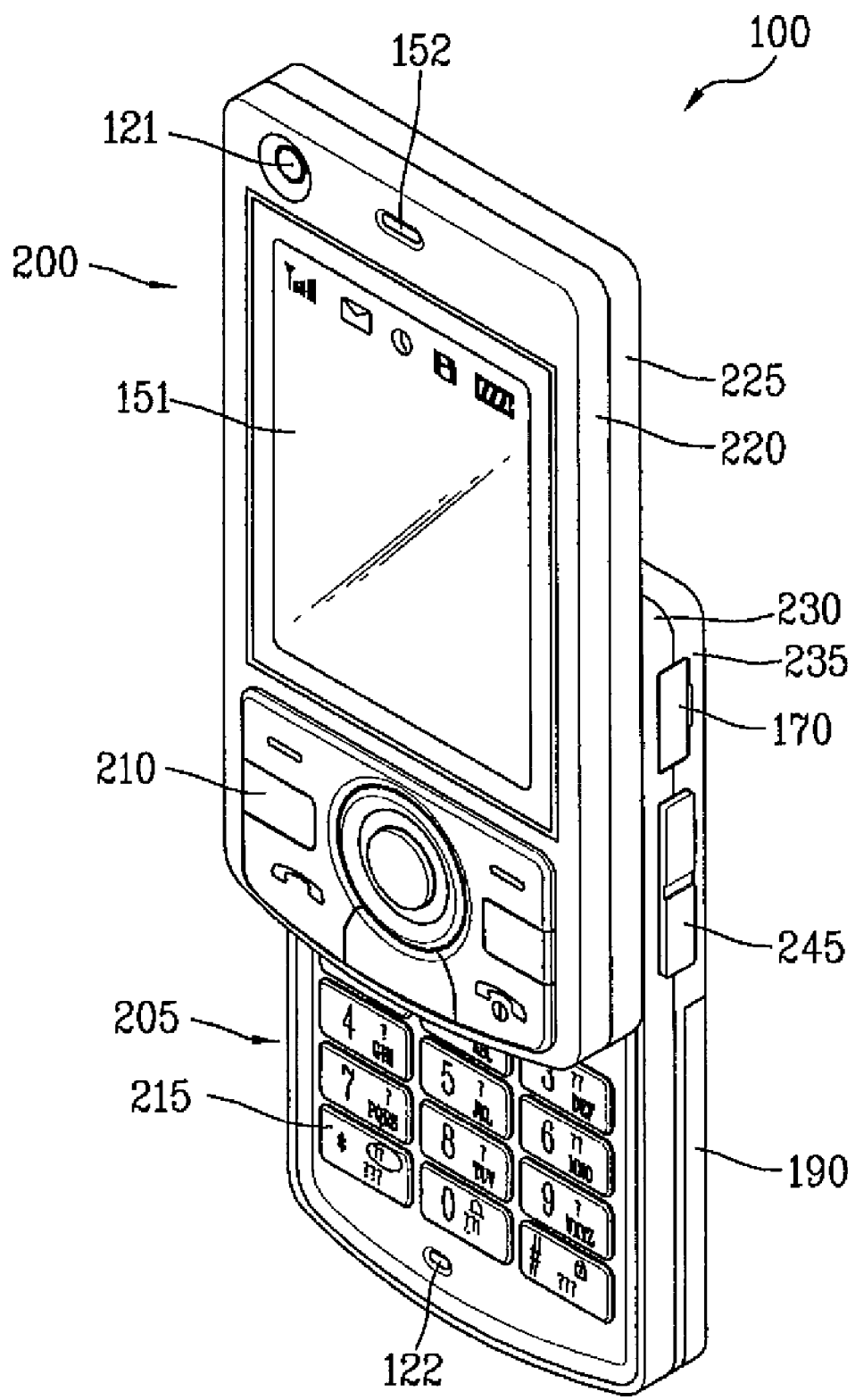
FIG. 2 is a front perspective view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
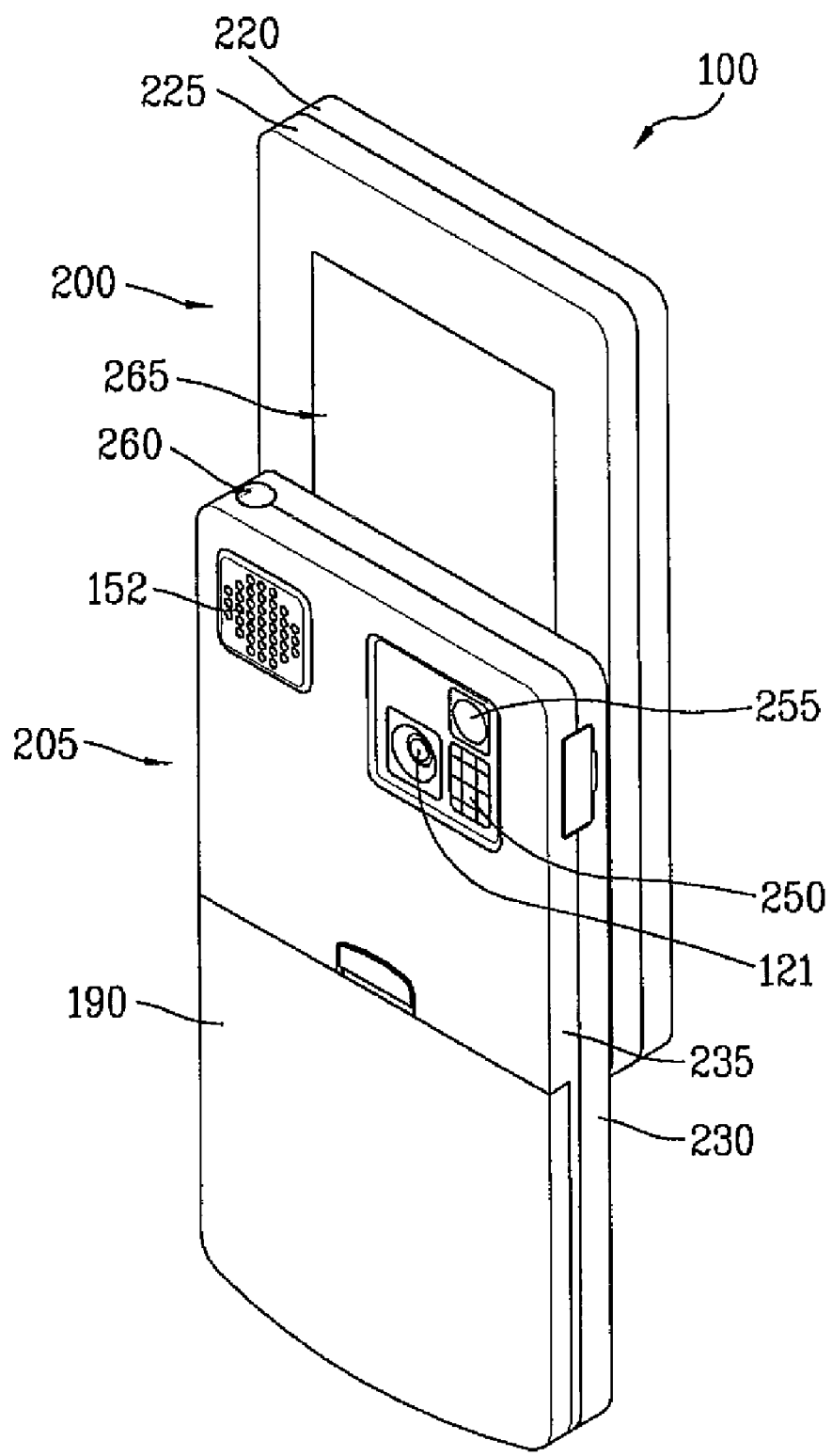
FIG. 3 is a rear perspective view of the mobile terminal shown in FIG. 2.

FIG. 3 is a rear side view of the mobile terminal 100 shown in FIG. 2. As shown in FIG. 3, the second body 205 includes the camera 121 and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
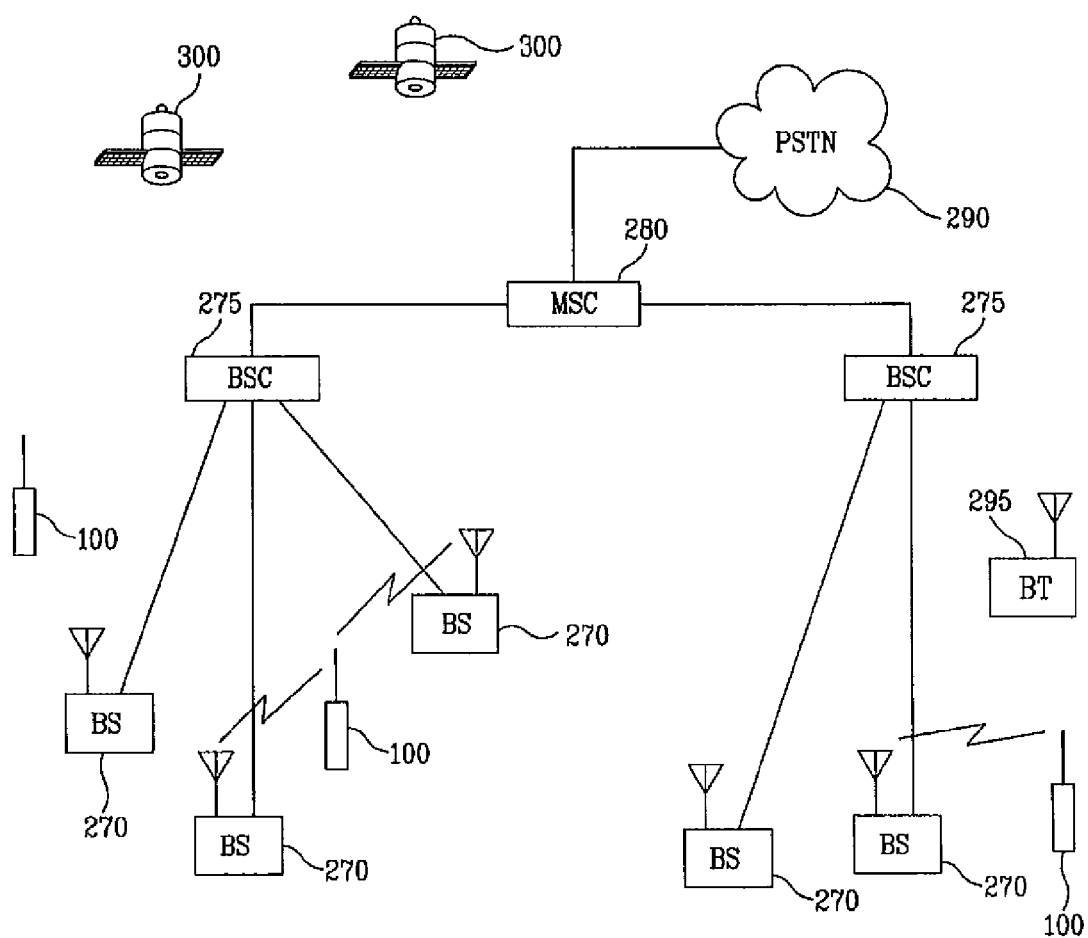
FIG. 4 is a block diagram of a CDMA wireless communication system operable with the mobile terminal of FIGS. 1 to 3.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description refers to the display 151 as including a touch screen.

The mobile terminal 100 is capable of performing data communication. Further, the speed or communication amount of the data communication can be graded in accordance with a quality of service (QoS). In particular, the QoS corresponds to overall techniques and concepts for managing traffics and bandwidths within a limited bandwidth by grading a service level in accordance with significance for an application. In addition, as discussed above, the terminal 100 performs data communication with other terminals using a base station. Also, the speed or charge for the data communication may vary in accordance with the QoS that is supported by the particular base station.

Figure 5:
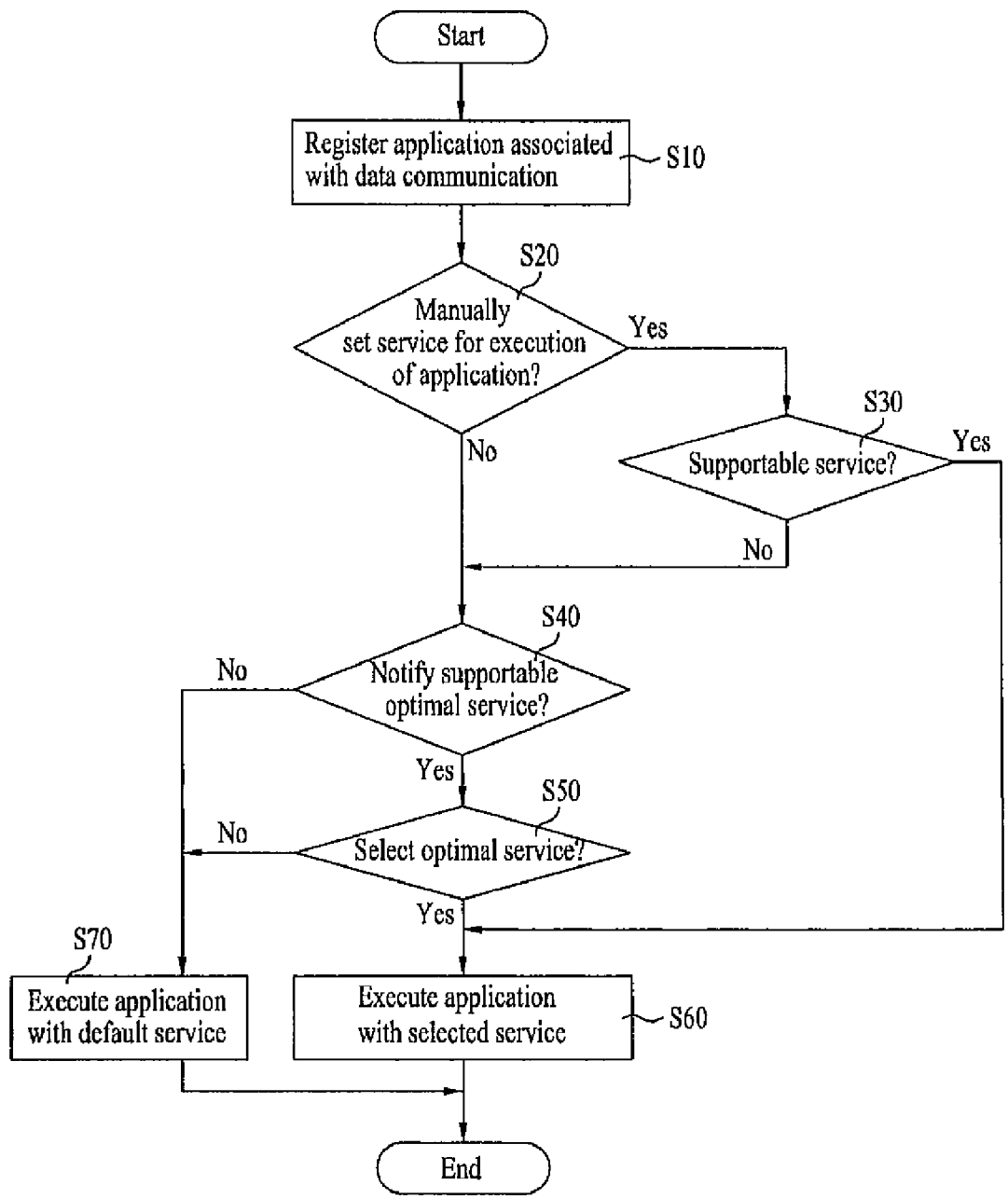
FIG. 5 is a flowchart illustrating a method of setting a service for data communication of a mobile terminal according to one embodiment of the present invention.

FIG. 5 is a flowchart illustrating a method of setting a service for data communication in a mobile terminal according to one embodiment of the present invention. Further, as discussed above, the mobile terminal 100 is able to perform data communication using a specific communication application. As shown in FIG. 5, the communication application associated with the data communication is registered in the mobile terminal (S10).

In addition, the communication application can be directly registered by a user or may be registered as a default in the mobile terminal 100. For instance, the user can register a specific communication application used to execute the data communication in an application loader. The application loader includes a routine for loading a program and the like in the memory 160.

Examples of the communication applications associated with or used to execute the data communication include an application enabling a specific webpage to be accessed via the Internet, an application enabling communication via the Internet, an application enabling video communication, an application enabling video-based services such as movies, news and the like to be usable via a telephone line or cable according to a request made by a user, an application enabling a specific music file to be downloaded or played, an application enabling a chatting service, an application enabling multimedia data to be transmitted/received, an application enabling a short message to be transmitted/received, and the like.

Further, the mobile terminal 100 according to one embodiment of the present invention enables a user to select a QoS for an execution of one of the above-enumerated applications. In particular, the user can manually selectively determine what service of quality is to be used with a desired data communication. In addition, when there is a plurality of communication applications associated with the data communication, the quality service can be set for each of the communication applications.

For instance, the quality service can be set to a fastest data rate for a communication application enabling a specific webpage to be accessed via the Internet. A least expensive service having a rather slow data rate can also be set for a communication application enabling a specific music file to be downloaded or played. The communication applications can also be grouped to have a different service set therefor.

In addition, when the user manually selects a QoS for a specific communication application (Yes in S20), the controller 180 decides or determines whether the selected quality of service is a service that is supported by a base station (S30). Further, the controller 180 informs a user about the selected quality service using information received from the base station.

For example, the controller 180 can inform the user about whether the selected service is supported by the base station. The controller 180 can also inform the user about billing information on the selected service or the like.

Also, if the service selected by the user is supported by the base station (Yes in S30), the controller 180 executes the specific communication application with the selected service (S60). That is, the data communication is performed via the execution of the specific communication application and via the wireless communication unit 110.

If the quality service selected by the user is not supported by the base station (No in S30), the controller 180 can recommend another quality service that can be supported by the base station (S40). For instance, the controller 180 can recommend an optimal service that is supported by the base station.

In addition, the optimal quality service can be determined with reference to various standards. For instance, a service having a fastest data rate can be set to an optimal service. Also, a service having a lowest use fee can be set to an optimal service. The controller 180 can also assign weight values to a use fee and a data rate, for example, and then set a service having a largest weight sum to the optimal service.

If the controller 180 recommends the optimal quality service (Yes in S40), the user can select the optimal service recommended by the controller 180 (S50). The specific communication application is then performed or executed with the selected service (S60). The data communication is also performed via the execution of the specific communication application.

If the controller 180 does not inform the user about a supportable optimal service (No in S40), the controller 180 executes the specific communication application with a specific default service (S70).

Further, one embodiment of the present invention is directed to setting a QoS for WiMAX (world interoperability for microwave access) communication service. WiMAX is an organization relevant to mobile Internet technology, and is a nonprofit organization established for enhancements of compatibility and mutual operability with broadband wireless access equipments and authentication thereof. Thus, the data communication of the mobile terminal 100 according to one embodiment of the present invention includes data communication via the mobile Internet.

Further, the service setting operation for the data communication of the mobile terminal 100 and the corresponding data communication can be performed by interoperation between an application loader and a service management program for managing the application loader.

Figure 6:
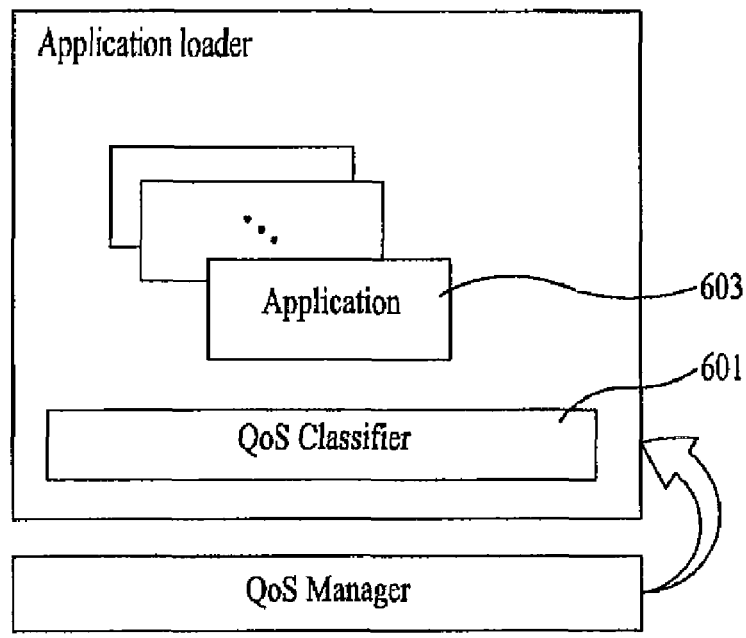
FIG. 6 is an overview of application load and QoS manager including in a mobile terminal according to an embodiment of the present invention.

In more detail, as shown in FIG. 6, at least one or more communication applications 603 are registered in the application loader. Further, a QoS classifier 601 is built in the application loader to classify the QoS actually set for each of the applications. A QoS manager, which is a service management program, substantially manages the application loader.

Further, the base station is able to inform the mobile terminal 100 of a supportable QoS. Thus, the mobile terminal 100 can know the supportable QoS based on the received information. Then, by transferring the corresponding information to the QoS classifier of the application loader, the QoS manager can manage QoS parameters for a corresponding service flow.

Figure 7:
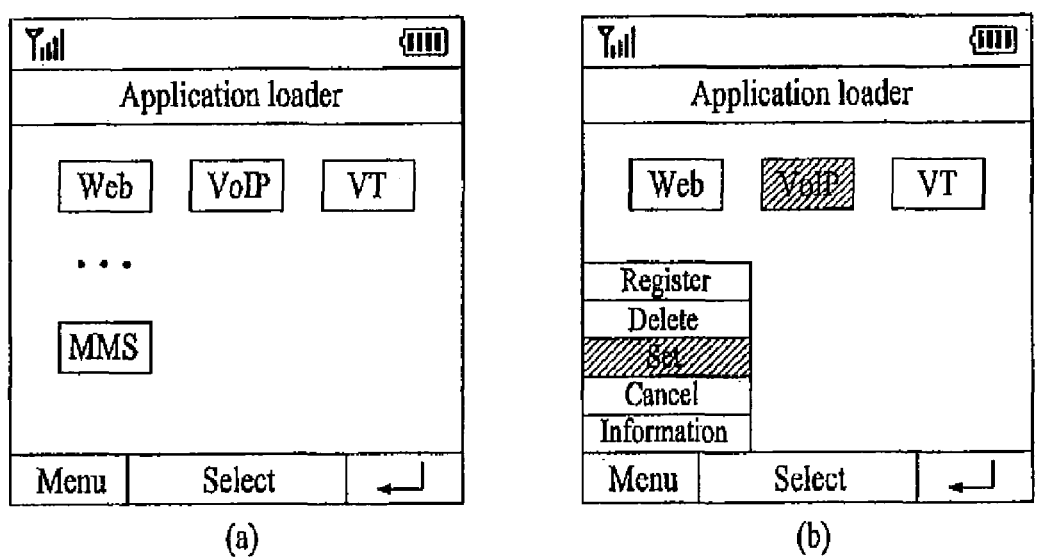
FIGS. 7(a) and 7(b) are overviews of display screens illustrating a procedure for registering a communication application for executing the data communication and a procedure for selecting a QoS for a corresponding registered communication application registration according to an embodiment of the present invention.

Next, FIGS. 7(*a*) and 7(*b*) are overviews of display screens illustrating a procedure for application registration associated with data communication and a procedure for selecting a QoS for a corresponding application registration according to an embodiment of the present invention.

As shown in FIG. 7(*a*), a communication application associated with data communication is registered in an application loader. The application registration can be executed in a manner similar to that of a shortcut procedure used for a specific menu registration in a personal computer.

A different data communication function can also be performed for each of the registered applications. For instance, the 'Web' application indicates a communication application enabling a specific webpage to be accessed via the Internet, the 'VoIP' communication application indicates an application enabling communication via the Internet, the 'VT' communication application indicates an application enabling video communication, and the 'MMS' communication application indicates a multimedia message service (MMS).

Further, the communication application is managed via the QoS manager. For instance, a registration of a communication application associated with data communication can be added using the QoS manager. A registered application can also be deleted using the QoS manager.

In addition, the menu option in FIG. 7(*a*) allows the user to select various functions for the QoS of a corresponding communication application. For example, the controller 180 can display options for setting, modifying, canceling, informing the inspection, etc. of the QoS of a specific one of the registered applications. Also, when there are a plurality of applications associated with data communication, the controller 180 can enable each of the applications to be independently registered in the QoS manager.

FIG. 7(b) illustrates an example of setting a QoS for a specific communication application selected from a plurality of communication applications registered in the application loader. In more detail, when the specific application is selected, and the user selects the 'Set' option from the 'Menu' key, the controller 180 displays a popup window allowing the user to select a particular QoS to be used for the selected communication application.

As shown in FIG. 7(b), the displayed popup window for selecting one function associated with the communication application includes setting the QoS for the application, registering the application, deleting the application, information inspection about the application, canceling the application, etc. Thus, the user can set a QoS of a specific application by selecting the 'setting' item. In addition, when an application registered in the application loader is displayed on a touchscreen, the user can set a QoS for a corresponding application using a touch input method.

Figure 8:
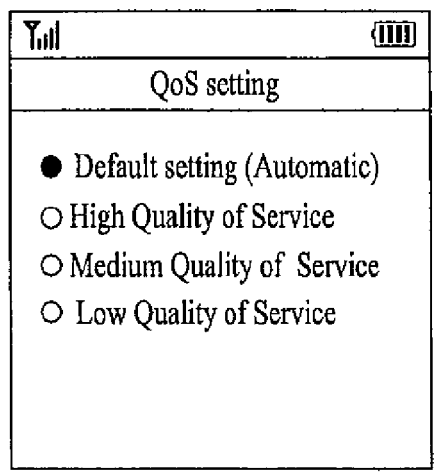
FIG. 8 is overview of a display screen illustrating a method of selecting a quality of service for a selected communication service for data communication in a mobile terminal according to one embodiment of the present invention.

Next, FIG. 8 is overview of a display screen illustrating a method of selecting a quality service for data communication of the mobile terminal 100 according to one embodiment of the present invention. In addition, in the display screen shown in FIG. 8, it is assumed a specific communication application has already been selected in FIG. 7.

As shown in FIG. 8, four types of QoSs can be selected. However, this is an example only, and more or less QoSs can be displayed. As shown in FIG. 8, the user can set 'Default service', or a specific service grade (e.g., high, medium or low quality service).

Figure 9:
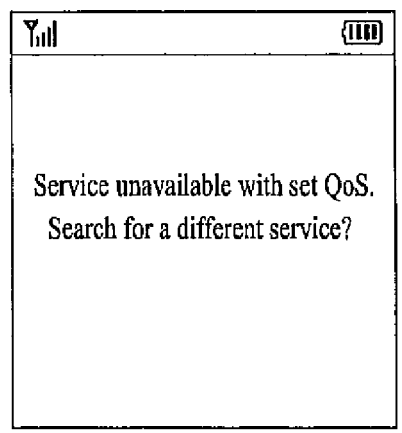
FIG. 9 is an overview of a display screen illustrating information being displayed indicating a selected quality of service is unavailable according to an embodiment of the present invention.

Further, as shown in FIG. 9, the controller 180 can display information on the selected service such as information that the selected service is not available. That is, if a base station does not support the selected service, the controller 180 displays information indicating that the selected service is not supportable. The controller 180 can also prompt the user to determine if they want to search for a different quality of service.

Figure 10:
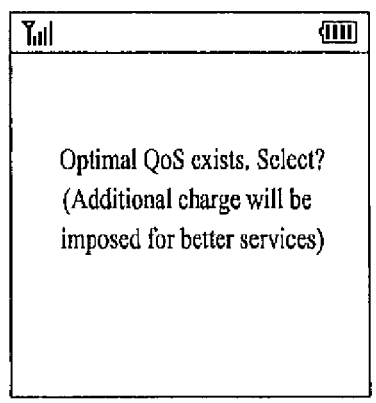
FIG. 10 is an overview of a display screen illustrating information being displayed indicating the selected quality of service includes additional billing charges according to an embodiment of the present invention.

As shown in FIG. 10, the controller 180 can also compute an optimal service based on various references and then inform the user about the optimal service. Referring to FIG. 10, the controller 180 includes information indicating that a billing charge may be imposed together with information indicating that there exists an optimal service.

Figure 11:
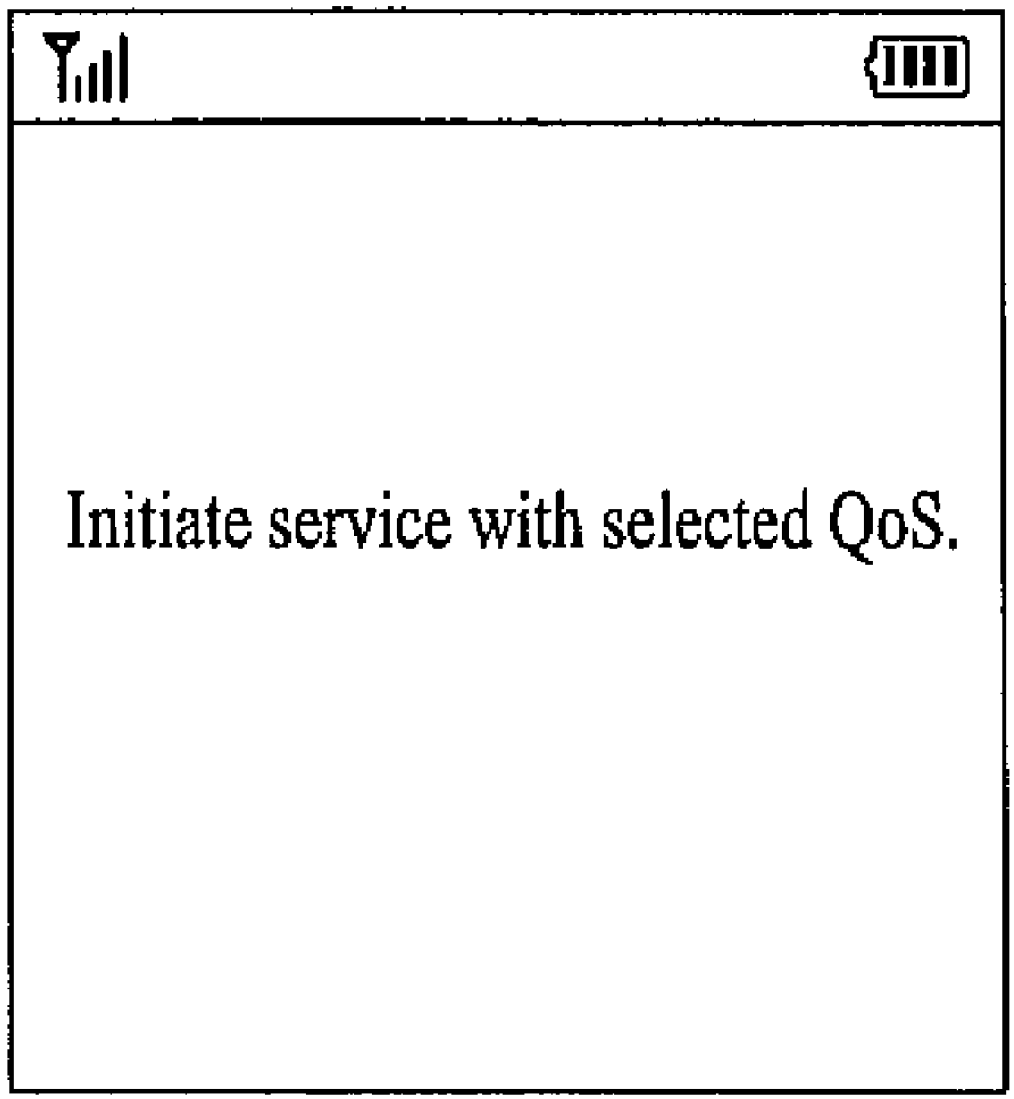
FIG. 11 is an overview of a display screen illustrating information being displayed indicating the selected quality of service is will be used for the selected communication application according to an embodiment of the present invention.

As shown in FIG. 11, the controller 180 can also inform the user that the selected service is a service supportable by a base station, and that the corresponding application will be executed with the selected service. The features shown in FIGS. 7-11 are also illustrated in the flowchart in FIG. 5.

The above-described embodiments are described with respect to a mobile terminal. However, the present invention is also applicable to other types of terminals such as a non-mobile terminal.

In addition, the above-described embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPCAs), processors, controllers, micro-controllers, microprocessors, other electronic units designed to perform the functions described herein, or a selective combination thereof. The computer-readable media include all kinds of recording devices in which data readable by a computer system are stored. The computer-readable media include ROM, RAM, CD-ROM, magnetic tapes, floppy discs, optical data storage devices, and the like, for example.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A terminal comprising:
a wireless communication unit configured to perform data communication with at least one other terminal;
a display configured to display a screen for selecting a communication application for executing the data communication and a display screen for selectively selecting a communication quality of service corresponding to the communication application; and
a controller configured to apply the selected communication quality of service to the communication application for executing the data communication,
wherein the wireless communication unit is further configured to receive information about the selected communication quality of service from a base station,
wherein the controller is further configured to provide information about the selected communication quality of service using the information received from the base station, and
wherein when the information indicates the selected communication quality of service is not supported by the base station, the controller is further configured to assign weight values to a use fee and a data rate for executing the data communication for quality of services supported by the base station, to set a quality of service having a largest weight sum as an optimal service, and to control the display to display the optimal service supported by the base station on the display screen.

2. The terminal of claim 1, wherein the controller is further configured to use a service management program on the mobile terminal to execute the selected communication quality of service for the data communication.

3. The terminal of claim 2, wherein the wireless communication includes a wireless Internet module and performs the data communication via the wireless Internet.

4. The terminal of claim 3, wherein the controller is further configured to provide an option to add or delete the communication application for executing the data communication.

5. The terminal of claim 3, wherein the controller is further configured to provide an option including at least one of canceling the communication application and outputting information about the communication application using the service management program.

6. The terminal of claim 2, wherein if there exists a plurality of communication applications associated for executing the data communication, the controller is further configured to provide an option including an independent registration of each communication application.

7. The terminal of claim 6, wherein the service management program manages each of the registered communication applications to enable the selection of the communication quality of service for the data communication to be independently executed by the controller.

8. A method of controlling a terminal, the method comprising:
allowing wireless data communication with at least one other terminal;
displaying a display screen for selecting a communication application for executing the data communication and a screen for selectively selecting a communication quality of service corresponding to the communication application;
applying the selected communication quality of service to the communication application for executing the data communication;
receiving information about the selected communication quality of service from a base station;
providing information about the selected communication quality of service using the information received from the base station; and
when the information indicates the selected communication quality of service is not supported by the base station, assigning weight values to a use fee and a data rate for executing the data communication for quality of services supported by the base station, setting a quality of service having a largest weight sum as an optimal service, and displaying the optimal service supported by the base station on the display screen.

9. The method of claim 8, further comprising:
executing a service management program on the mobile terminal to use the selected communication quality of service for the data communication.

10. The method of claim 9, wherein the data communication is executed via the wireless Internet.

11. The method of claim 10, further comprising:
providing an option for adding or deleting the communication application for executing the data communication.

12. The method of claim 10, further comprising:
providing an option including at least one of canceling the communication application and outputting information about the communication application using the service management program.

13. The method of claim 9, wherein if there exists a plurality of communication applications associated for executing the data communication, the method further comprises providing an option including an independent registration of each communication application.

14. The method of claim 13, wherein the service management program manages each of the registered communication applications to enable the selection of the communication quality of service for the data communication to be independently executed.

* * * * *